N. MALMAR.

Coat.

No. 9,631. Reissued March 29, 1881.

Witnesses:
John M. Stetler
Henry Sellman

Inventor:
Nils Malmar
by A. W. Almqvist
Attorney.

UNITED STATES PATENT OFFICE.

NILS MALMAR, OF BROOKLYN, NEW YORK.

COAT.

SPECIFICATION forming part of Reissued Letters Patent No. 9,631, dated March 29, 1881.

Original No. 214,431, dated April 15, 1879. Application for reissue filed December 2, 1880.

*To all whom it may concern:*

Be it known that I, NILS MALMAR, of Brooklyn, in the county of Kings and State of New York, have invented a new and useful Improvement in Coats, of which the following is a specification.

My invention has for its object to provide an improvement in coats, especially overcoats, whereby the same coat may be adapted for wear in the spring, fall, and winter, thus avoiding the necessity and additional expense to the wearer of having different coats for the different cold seasons. For this purpose I supply an ordinary lined or skeleton coat with an extra lining, with or without sleeves, so constructed that it may be readily detached and laid aside or replaced by a lighter or a heavier one, as the greater or less severity of the weather may require.

Figure 1:
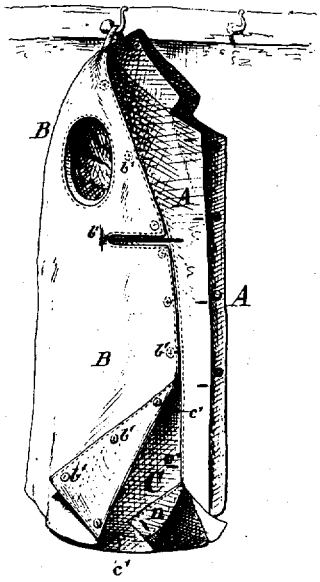
Figure 2:
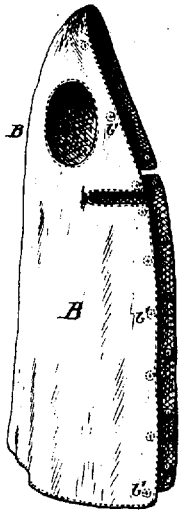

In the accompanying drawings, Figure 1 represents an ordinary lined overcoat provided with my improvement. Fig. 2 represents the extra inner lining detached.

Like letters of reference indicate like parts.

A designates the coat, C the ordinary lining thereof, and B the supplementary lining.

The lining C is made as usual, except that a strip, D, of linen or other suitable material, is applied or stitched to it all around its edges to support the fastenings by which the extra or supplementary lining B is secured in place.

The lining B is so formed as to fit neatly upon the ordinary lining C, with its edges corresponding with the edges of the said lining C. The edges of the extra lining B are secured detachably to the lining C by buttons $b'$ and button-holes $c'$, or by hooks and eyes, pins, or any other suitable means. When buttons and button-holes are used I prefer to attach the buttons to the extra lining B, and form the button-holes in the ordinary lining C and the strips D, as shown in the drawings.

If the coat A be simply an ordinary skeleton-coat—that is, without lining—the strip D may be dispensed with and the extra lining B provided with hooks or button-holes for fastening it to eyes or buttons attached along the inner edge of the lapel.

With this construction the coat can be worn without the extra lining B, and linings of different thicknesses and warmth can be used, as the intensity of the cold may require.

Be it distinctly understood that the ordinary coat-lining C (not used in skeleton-coats, and the lower corner of which is shown in Fig. 1 as turned up simply to exhibit the strip D) is not detachable, and forms no part of my invention, and should not cause it to be confused with that shown in United States Patent No. 46,575, from which it essentially differs. In said patent the cover and lining of the wrapper shown are sewed together in the usual way, leaving occasional openings for insertion between them of an interlining made in sections of soft leather, in order that the latter may be removed to allow of washing the garment apart from the said interlining. Mine is not an interlining, but the inner lining, forming that part of the coat which is nearest the body of the wearer.

Having thus described my invention, what I claim as new, and desire to secure by Letters Patent, is—

1. A temporarily attachable supplementary coat-lining, B, the same being the inner lining, distinct from an interlining, as explained, and forming that part of the coat which is nearest the body of the wearer, substantially as and for the purpose set forth.

2. A supplementary inner lining, B, having fastening devices $b'$ along its edges, in combination with a coat, A, having corresponding fastening devices $c'$ along the inner edge of its lapel, substantially as and for the purpose set forth.

3. A coat, A, provided with a strip, D, secured to the edges of the ordinary lining C, devices for temporary fastening being applied to the said parts C D, in combination with a supplementary inner lining, B, substantially as shown and described.

NILS MALMAR.

Witnesses:

A. W. ALMQVIST,

C. SEDGWICK.